Dec. 24, 1946.  W. B. GRIFFITH  2,413,140
THERMOSTAT
Filed Dec. 12, 1941
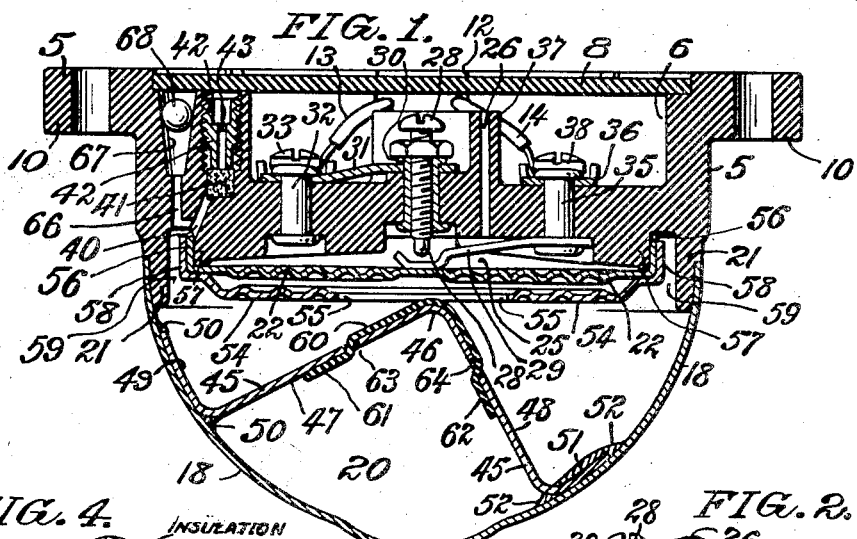
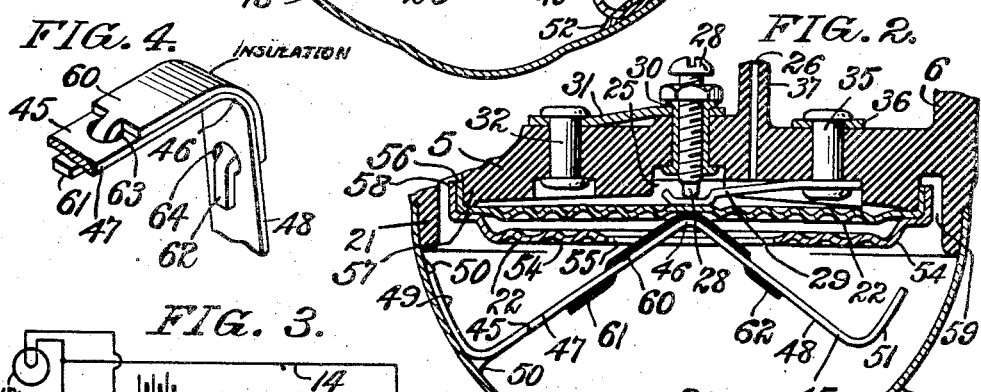
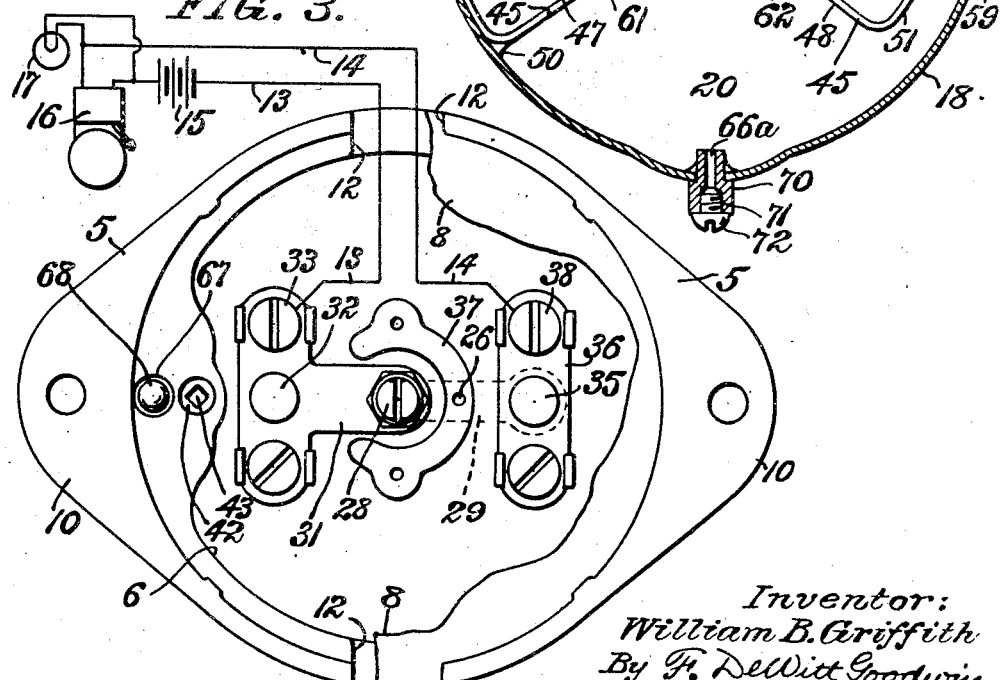
Inventor:
William B. Griffith
By F. DeWitt Goodwin
Attorney Patented Dec. 24, 1946

2,413,140

UNITED STATES PATENT OFFICE 2,413,140

THERMOSTAT

William B. Griffith, Audubon, N. J., assignor to Fire Devices, Inc., a corporation of New Jersey Application December 12, 1941, Serial No. 422,762

21 Claims. (Cl. 200—140)

My invention relates to improvements in fire protection apparatus and particularly to thermostats for controlling electrical circuits for giving an alarm and actuating other devices.

The object of my invention is to provide a rapid rate in rise of temperature thermostat with fixed temperature operating means.

A further object is to embody a fixed temperature element in the air chamber of a rate in rise of temperature thermostat, whereby the thermostat will be actuated by the fixed temperature element in the event of a slow smoldering fire which would permit the temperature within the thermostat casing to equalize with the temperature surrounding the casing without operating the rate in rise of temperature means. My device will actuate when the atmosphere surrounding the thermostat reaches a predetermined temperature and will operate the thermostat and close the electric circuit regardless of the time consumed for the fire to develop.

A further object is to provide a fixed temperature element in the form of a spring which is directly mounted upon the inner surface of the heat conducting metal shell of the thermostat, and confine the spring in a restricted position by means of material which will fuse and release the spring at a predetermined temperature and actuate the thermostat.

A further object is to provide means for electrically insulating the spring for preventing the latter and the shell of the thermostat from being energized after the spring has been released and closed the circuit between the conductors of the thermostat.

A further object is to construct a stop plate, or support, for the flexible diaphragm of a rate in rise of temperature thermostat so that the stop plate will permit the free movements of the spring of the fixed temperature device to pass freely through an opening formed in the stop plate.

A further object is to construct the body of the thermostat with a novel testing vent and means for sealing the vent.

A further object is to provide a thermostat of unit construction having a rate in rise of temperature device and fixed temperature operating means which will be durable and can be manufactured at a low cost.

These together with various other novel features of construction and arrangement of the parts, which will be more fully hereinafter described and claimed, constitute my invention.

Referring to the accompanying drawing:

Fig. 1 is a central vertical sectional view of a thermostat embodying my invention.

Fig. 2 is a partial sectional view similar to Fig. 1 showing the parts in the operative position.

Fig. 3 is a plan view of Fig. 1.

Fig. 4 is a perspective view of a portion of the fixed temperature element and showing novel means for attaching a sheet of insulating material.

In the drawing, in which like reference characters refer to like parts, 5 represents a thermostat body, or support, of unit construction, formed of insulating material and provided with a recess 6, enclosed by a removable cover 8. Lugs 10 are provided upon the body 5 adapted for mounting the body upon the ceiling of a room to be protected from fire hazard.

The body 5 is provided with openings 12 for the entrance of wires 13 and 14 of an electric circuit including a source of current, or battery 15, an alarm device, or bell 16, or other device 17. A hemispherical shell 18, formed of thin heat conducting metal, is mounted upon the body 5 and forms an air chamber 20. The shell 18 is tightly secured upon the annular depending portion 21 of the body 5. A flexible corrugated diaphragm 22 is mounted within the shell 18 and forms one wall of the chamber 20.

The body 5 is also provided with an air relief chamber 25, which is in communication with the atmosphere through a passage 26 formed in the body 5. The diaphragm 22 is mounted in spaced relation with the central portion of the body 5 and the chamber 25 permits the diaphragm to be deflected.

A pair of electrical contacts 28 and 29 are mounted upon the body 5. The contact 28 consists of a screw located centrally upon the body and adjustably mounted in a sleeve, or rivet 30, having a bore provided with a screw thread engaged by the screws 28. A conductor plate 31, of T-shaped construction is secured upon the body 5 by the sleeve 30 and also by a rivet 32. The plate 31 is provided with a binding screw 33 to which the wire 13 is attached.

The contact 29 is in the form of a spring plate having one end thereof secured by a rivet 35 to the body 5. A conductor plate 36 is also secured to the body by the rivet 35. The body 5 has an upstanding wall 37 for insulating the plate 36 from the contact screw 28.

The plate 36 is provided with a binding screw 38 to which the wire 14 is attached. The free end of the spring contact plate 29 is normally in spaced relation to the contact screw 28 and is adapted to be moved by the diaphragm 22 into engagement with the contact 28 for closing the electric circuit.

The body 5 is provided with a restricted orifice, or aperture 40, having filtering material 41 therein adapted to be compressed by a sleeve 42 having an aperture 43. The sleeve 42 is in threaded engagement with the body 5 and is adapted to be adjusted for allowing slow changes of air pressure within the chamber 20 to equalize with the atmosphere in a manner well known in the art.

A sudden rate in rise of temperature thermostat is formed as above described which will distend the diaphragm 22 and close the circuit between the contacts 28 and 29, when the air confined in the chamber 20, by the restricted orifice 40, expands due to a sudden increase in temperature acting upon the outer surface of the shell 18 in the event of a fire.

A novel feature of my invention is a fixed temperature element, or actuating means 45, adapted for closing the electric circuit between the contacts 28 and 29, in the event of a slow smoldering fire causing a rise in temperature which is too slow to operate the diaphragm, the fixed temperature element 45 will actuate the thermostat at a predetermined temperature.

The fixed temperature element 45 comprises a spring preferably in the form of a flat plate spring 45 and located within the chamber 20. The spring 45 is provided with a folded or looped portion 46, located adjacent to the center of its length, with the members 47 and 48 positioned approximately at right angles and forming the restricted medial portion 46.

The fixed temperature element or spring 45 is formed with its members 47 and 48 of slightly different lengths. An end portion 49 of the longer member 47 is permanently secured to the inner surface of the shell 18 by welding or securing it with hard solder 50. The spring 45 is placed under deflection and the end portion 51 of the shorter member 48 is secured to the inner surface of the shell by soft solder 52, or other material which is fusible at a predetermined temperature. By this construction the medial portion 46 of the spring 45 is normally held in spaced relation with the diaphragm 22.

A stop, or support plate 54 is provided for limiting the movement of the diaphragm 22 by excess pressure without the chamber 20. The plate 54 is provided with a central aperture, or opening 55, for the passage of the medial portion 46 of the spring 45, into engagement with the diaphragm 22, for moving the latter and the contact plate 29 into electrical contact with the center contact screw 28, when the fixed temperature element 45 is released from the shell by the fusing of the material 52, at a predetermined temperature of the atmosphere surrounding the shell 18.

The diaphragm 22 is provided with an annular upstanding flange 56 which is secured upon the annular shoulder 57 of the body 5. The stop plate 54 is provided with a similar flange 58 which fits over the flange 56 of the diaphragm. By this construction the outer edges of the diaphragm 22 and stop plate 54 are rigidly mounted upon the body 5, and electrically insulated from the shell 18. The support, or body 5, is provided with an annular recess 59 surrounding the diaphragm and through which the restricted orifice 40 and the passage 66 communicate with the air chamber 20.

The fixed temperature element, or spring 45, is electrically insulated from the diaphragm 22 in a novel manner. A layer or sheet of insulating material 60 is attached to the cylindrically curved medial portion of the plate spring 45, by means of end tongues 61 and 62, as shown in Figs. 1 and 4. The spring 45 is provided with apertures 63 and 64 to receive said tongues, thereby rigidly securing the sheet 60 to the spring 45 for insulating the latter from the diaphragm 22 and thereby preventing the shell 18 from being charged when the electric circuit is closed between the contacts 28 and 29, by the engagement of the diaphragm with the contact plate 29, as shown in Fig. 2.

A novel testing means is provided for calibrating the rate of the escapement of air from the chamber 20 through the restricted orifice 40, and for regulating the adjustment of the contact screw 28, after the device has been completely assembled.

The chamber 20, in addition to having the restricted orifice 40, is provided with an aperture 66, as shown in Fig. 1, or an aperture 66a, as shown in Fig. 2, through which air under pressure may be forced into the chamber 20. The aperture 66 is formed through the body, or support 5, and has a conical portion 67 which is adapted to be sealed by a lead pellet 68 after the device has been tested. The conical aperture 67 is adapted for readily attaching an air hose having a conical nozzle, not shown in the drawing. The testing aperture 66a, shown in Fig. 2, is formed through a fitting 70 attached directly to the shell 18. Said fitting 70 is provided with a threaded sleeve 71 adapted for the attachment of an air hose coupling, not shown in the drawing. The aperture 66a is adapted to be sealed by means of a lead pellet, such as shown at 68 in Fig. 1, or by a screw, or threaded plug 72, as shown in Fig. 2.

By providing the device with a testing aperture 66, or 66a, communicating with the chamber 20, which aperture is separate from the restricted orifice 40, the device can be readily tested after it is assembled to ascertain if the chamber 20 is air tight and the shell 18 and other parts are properly secured upon the body 5 to prevent leakage.

By applying air under pressure through the aperture 66, or the aperture 66a, to the chamber 20 the diaphragm 22 may be distended under a predetermined air pressure and the screw 28 may be adjusted so that the electric circuit will be closed between the contacts 28 and the diaphragm at the desired pressure of air within the chamber 20.

An adjustment of the restricted orifice 40 is made possible by providing the chamber 20 with a testing aperture. When air is injected through an aperture 66, or 66a, into the chamber 20 under the desired testing pressure, the sleeve 42, of the restricted orifice 40, may be adjusted until the necessary pressure is applied by said sleeve 42 to the filtering material 41, for regulating the rate of escapement of air through the restricted orifice 40, from the chamber 20 and said rate may be calibrated to permit the air to equalize with the atmosphere within a definite period of time.

Heretofore in devices of this character the various parts were tested separately before they were attached and assembled in the completed structure. My novel testing means assures accuracy in operation and all uncertainty is eliminated.

The operation of my invention is as follows:

In the event of a fire causing a sudden increase in the temperature of the air surrounding the shell 18, the pressure of the air within the chamber 20 will increase and distend the diaphragm and close the electric circuit between the contacts 28 and 29 and operate the signal devices 16 and 17.

The diaphragm 22 will maintain the circuit closed during the time required for the air under pressure in the chamber 20 to equalize with the atmosphere through the restricted orifice 40. If the increase in the pressure of the air in the chamber 20 is slow and equalizes with the atmosphere without moving the diaphragm, the fixed temperature element, or spring 45, will operate the diaphragm and close the circuit, when the fire reaches a predetermined temperature. When the atmosphere surrounding the shell 18 reaches a predetermined temperature the fusible material 52 will melt and release the spring 45. When so released the spring 45 will engage and move the diaphragm into the position shown in Fig. 2, and maintain the diaphragm 22 and the contact plate 29 in circuit closing position with the contact screw 28, thereby continuously operating the alarm or devices included in the electric circuit.

Various changes in the construction and arrangement of the parts may be made without departing from my invention.

I claim:

1. In a device of the character described, an insulating support, a pair of conducting members mounted thereon and adapted for connection to a source of current supply and a signal, a pair of conductors each electrically connected to one of said conducting members respectively, a heat-conducting air chamber mounted on said insulating support and provided with an air opening therein, a flexible metallic diaphragm electrically connected with one of said conductors and forming a wall of said chamber and automatically movable relatively to the other one of said conductors to close the circuit and energize the signal by the expansion of air in said chamber, a releasable spring mounted in said chamber and adapted to positively move said diaphragm into circuit closing position, and fusible means normally holding said spring in inoperative position.

2. In a device of the character described, an insulated support, a pair of terminals mounted upon said support and adapted to be included in an electric circuit including a source of current and an energizable device, an air chamber mounted upon said support, a flexible diaphragm forming a wall of said chamber and in circuit with one of said terminals and adapted to be distended to close the circuit through the other one of said terminals and energize the signal upon expansion of the air in said chamber responsive to the action of heat, a fixed temperature element mounted in said chamber and means normally holding said element in inoperative position and responsive to the action of heat to release said element whereby it will positively move said diaphragm into circuit-closing position.

3. In a device of the character described, an insulated support, an air chamber mounted thereon, a plate forming a wall of said chamber and provided with an opening therein, a flexible diaphragm mounted on said plate, a pair of electrical contacts mounted upon said support and in circuit with a source of current supply and a signal, a conductor connecting said diaphragm with one of said contacts, said diaphragm adapted to be distended to circuit closing position relatively to the other one of said contacts and energize the signal upon expansion of the air in said chamber responsive to the action of heat, a fixed temperature element rigidly mounted in said chamber and fusible means normally holding said element in inoperative position and fusible under the action of heat to release said element whereby it will move through the opening and force said diaphragm into circuit-closing position.

4. A device of the character described, an insulating support, a pair of electrical contacts mounted thereon in circuit with a source of current supply and a signal, an air chamber mounted on said support, a flexible diaphragm associated with said air chamber and normally spaced from one of said contacts, spring means normally holding said diaphragm in inoperative spaced relation to said first contact and electrically connecting said diaphragm with said second contact, a spring element enclosed by said chamber and fusible means adapted upon fusing to permit said spring element to move said diaphragm into circuit-closing position relatively to said first contact.

5. In a device of the character described, an insulating support, a breather opening therein, a pair of electrical contacts mounted thereon, a heat-responsive air chamber connected to said support and communicating with said breather opening, a plate mounted in said chamber and provided with an opening therein, a flexible diaphragm engaging said plate but spaced from said support to provide a relief chamber having an air passageway communicating with the atmosphere, spring means connected to one of said contacts and engaging said diaphragm to normally retain it from engagement with the other contact, a releasable fixed temperature element mounted in said air chamber and fusible means normally holding said element in inoperative position and adapted, upon fusing, to permit said element to move through the opening in said plate and move said diaphragm into circuit closing position relatively to said other contact.

6. In a device of the character described, an insulated support, an air chamber mounted thereon, a flexible diaphragm associated with said chamber and in circuit with a source of current supply and a signal and adapted to be distended to close the circuit and energize the signal upon expansion of air in said chamber and a sealed fixed temperature element normally held under tension and releasable by the action of heat to move said diaphragm into circuit closing position and energize the signal.

7. In a device of the character described, an insulating support, a pair of electrical contacts mounted upon said support and adapted to be included in an electric circuit, a hollow metal shell mounted upon said support and forming a heat responsive chamber, a flexible diaphragm electrically connected with one of said contacts and forming one wall of said chamber, means mounting the diaphragm upon said support normally in spaced relation with the other one of said contacts and movable by the expansion of air in said chamber for bringing the contacts into electrical connection, a resilient element mounted in said shell and adapted for moving the diaphragm into circuit closing position, and fusible means securing said element in a restrained position upon the inner surface of the shell in spaced relation with the diaphragm, and said fusible means adapted to fuse and release said element at a predetermined temperature for engaging and moving the diaphragm.

8. In a device of the character described, an insulating support, a pair of electrical contacts mounted upon said support and adapted to be included in an electric circuit, a metallic shell mounted upon said support and forming a heat responsive air chamber, a flexible diaphragm electrically connected with one of said contacts and forming one wall of said chamber, means mounting the diaphragm upon said support normally in spaced relation with the other one of said contacts, said diaphragm adapted to be moved by the expansion of air in said chamber for bringing the contacts into electrical connection a spring metal plate having members thereof arranged at approximately right angles adjacent to its medial portion, means permanently securing one end of said plate upon the inner surface of the shell, means fusible at a predetermined temperature securing the opposite end of said plate upon the inner surface of the shell with said plate restrained from engagement with the diaphragm, and said plate arranged for engaging the medial portion thereof with the diaphragm for moving the latter into circuit closing position relatively to said contacts upon the fusing of the fusible means.

9. In a device of the character described, an insulating support, a pair of electrical contacts mounted upon said support and included in an electric circuit, a metallic shell mounted upon said support and forming a heat responsive chamber, a flexible diaphragm electrically connected with one of said contacts and forming one wall of said chamber, means mounting the diaphragm upon said support normally in spaced relation with the other one of said contacts, said diaphragm adapted to be moved by the expansion of air in said chamber for bringing the contacts into electrical connection said support forming insulating means between the diaphragm and the shell, a resilient element mounted in said chamber adapted for moving the diaphragm into circuit closing position relatively to said contacts, means fusible at a predetermined temperature securing said element in a restricted position upon said shell in spaced relation with the diaphragm, and insulating means interposed between said element and the diaphragm for insulating said element when in engagement with the diaphragm.

10. In a device of the character described, an insulating support, a pair of electrical contacts mounted upon said support and included in an electric circuit, a metallic shell mounted upon the support forming a heat responsive air chamber, a flexible diaphragm electrically connected with one of said contacts and forming one wall of said chamber, means mounting the diaphragm upon said support in spaced relation with the other one of said contacts, said diaphragm adapted to be moved by the expansion of air in said chamber for bringing the contacts into electrical connection a spring metal plate having members arranged at approximately right angles adjacent to its medial portion, means permanently securing one end of the plate upon the shell, means fusible at a predetermined temperature securing the opposite end of said plate upon the shell with the plate spaced from the diaphragm, a sheet of insulating material mounted upon the medial portion of the plate for insulating the latter from the diaphragm, and said plate arranged for moving the diaphragm into circuit closing position relatively to said contacts upon the fusing of said fusible means.

11. In a device of the character described, an insulating support, electrical contacts mounted upon said support and included in an electric circuit, a metallic shell mounted upon said support and forming a heat responsive chamber, a flexible diaphragm electrically connected with one of said contacts and forming one wall of said chamber, means mounting the diaphragm upon said support normally in spaced relation with the other one of the contacts, said diaphragm adapted to be moved by the expansion of air in said chamber for bringing the contacts into electrical connection a spring metal plate having members thereof arranged at approximately right angles adjacent to its medial portion, means permanently securing one end of said plate upon the shell, means fusible at a predetermined temperature securing the opposite end of said plate to the shell with the plate restrained from engagement with the diaphragm, a sheet of insulating material interposed between the medial portion of the plate and the diaphragm, said sheet having end tongues formed thereon, said plate having apertures formed therein for receiving said tongues and securing said sheet upon the plate, and said plate arranged for moving the diaphragm into circuit closing position relatively to said contacts upon the fusing of said fusible means.

12. In a device of the character described, an insulating support, a pair of electrical contacts mounted upon said support and adapted to be connected with a source of current supply and an energizable device, an annular flange upon said support, a thin metal hemispherical shell secured upon said flange and forming an air chamber, a flexible diaphragm electrically connected with one of said contacts and forming one wall of said chamber and adapted to be distended to bring said contacts into electrical connection upon the expansion of air in said chamber against the diaphragm responsive to the action of heat, an annular flange upon said diaphragm of smaller diameter than the shell, a shoulder upon said support upon which the flange of the diaphragm is secured in spaced relation with the shell, a plate having an annular flange mounted upon the flange of the diaphragm, said plate having a central opening formed therein, a spring plate located in said chamber and adapted for movement through said central opening of the plate into engagement with the diaphragm for moving the latter into a position to bridge said contacts, and fusible material normally securing the spring plate upon the inner surface of the shell in spaced relation with the diaphragm and adapted to fuse and release the spring plate at a predetermined temperature.

13. A thermostat comprising an insulating support having a pair of terminals mounted thereon and a contact member mounted therethrough, a metallic conductor connected to one of the said terminals and to the said contact member, a diaphragm positioned across an area of the said insulating support, said diaphragm normally positioned in spaced relation to the said contact member, a flexible contact member connected to the other one of the said terminals and engaging the said diaphragm, a metallic member affixed to the said insulating support, a spring metal strip affixed at one of its ends by conventional means to the said metallic member and having its other end affixed to the said metallic member by means of fusible solder, the said spring metal strip being retained in strained position and adapted upon the fusing of the fusible solder to move into engagement with the said diaphragm and cause the said flexible conductor to be moved into engagement with the said contact member so as to complete a circuit through the device.

14. A thermostat comprising an insulated support having a pair of terminals mounted thereon and a contact member mounted therethrough, a metallic conductor connected to one of said terminals and to the said contact member, a diaphragm positioned across an area of the said insulating support, a shield having a centrally positioned opening therein positioned across the said diaphragm, a flexible contact member connected to the other one of the said terminals and engaging the said diaphragm centrally thereof, a metallic shell affixed to the said insulating support, a spring metal strip affixed at one end of its ends by conventional means to the said metallic shell and having its other end affixed to the said metallic shell by means of fusible solder, the said spring metal strip normally tending to move into engagement with the said diaphragm and being retained in strained position by the said fusible solder and adapted upon the fusing thereof to move into the said opening of the said shield and into engagement with the said diaphragm and cause the said flexible conductor to be moved into engagement with the said contact member so as to complete a circuit through the device.

15. In a circuit closer, an insulating support member, a pair of circuit terminals mounted thereon, and a contact member mounted therethrough, a metallic conductor connected to one of the said terminals and to the said contact member, means adapted to establish an electrical circuit between the said terminals, said means comprising a flexible conductor connected to the other one of the said terminals and having a portion thereof spaced apart from although adjacent to the said contact member, a shell affixed to the said support member, a spring affixed to the said shell by means of fusible material, the said spring adapted upon being freed at one end thereof by the fusing of the fusible material to move toward the said flexible conductor, means positioned between the said spring and the said flexible conductor adapted to receive and direct movement of the said spring to the said flexible conductor to insure the application of the spring's movement thereto, said means comprising a diaphragm positioned over a relatively large area of the said support member, said flexible conductor adapted to move into contact with the said contact member upon being moved by the said diaphragm and spring, so as to establish an electrical circuit through the device.

16. A thermal circuit controller having a pair of electrical terminals adapted for connection with a source of current supply and an energizable device, an air chamber positioned in operative relation to said terminals, a distendable element associated with said chamber and adapted to be distended to establish electrical connection between said terminals and energize said device by pressure of the expanded air in the chamber against said element responsive to the action of heat and means inert to the expansion of air in said chamber but responsive to the action of heat for also distending said element to establish electrical connection between said terminals.

17. A thermostat comprising an insulating support having a pair of circuit terminals mounted thereon and a contact member mounted therethrough, a metallic conductor connected to one of the said terminals and to the said contact member, a secondary metallic contact member connected to the other one of the said terminals and spaced apart from the said contact member, a metallic shell positioned on the said support, a spring metal strip affixed to the said metallic shell by means of fusible solder, the said spring metal strip being retained in strained position and adapted upon the fusing of the solder to forcefully engage the said secondary metallic conductor and move the same into engagement with the said contact member, so as to complete a circuit through the device.

18. A thermostat comprising an insulating support having a pair of circuit terminals mounted thereon, and a contact member mounted therethrough, a metallic conductor connected to one of the said terminals and to the said contact member, a secondary metallic contact member connected to the other one of the said terminals and spaced apart from the said contact member, a metallic shell positioned on the said support, a spring metal strip of angular formation having one of its ends affixed to the metallic shell by conventional means and having its other end affixed to the said metallic shell by means of fusible solder, the said spring metal strip being retained in strained position and adapted upon the fusing of the fusible solder to engage the said secondary metallic conductor and move the same into engagement with the said contact member so as to complete a circuit through the device.

19. In a device of the character described, an insulating support, a pair of electrical contacts mounted upon said support and adapted for connection with a source of current supply and an energizable device, an air chamber mounted upon said support, a flexible diaphragm electrically connected with one of said contacts and forming one wall of said chamber and adapted to be distended to bring said contacts into electrical connection and energize said device by pressure of the expanded air in the chamber against the diaphragm responsive to the action of heat, said chamber having a restricted orifice through which the air in the chamber may slowly equalize with the atmosphere, means for regulating the rate of discharge through said orifice, said chamber having a second aperture in communication therewith through which air under pressure may be injected into said chamber for testing and regulating the rate of discharge through said restricted orifice, and means for sealing said second aperture.

20. In a device of the character described, an insulating support, a pair of electrical contacts mounted upon said support and adapted for connection with a source of current supply and an energizable device, a shell secured upon said support forming an air chamber, a flexible diaphragm electrically connected with one of said contacts and forming one wall of said chamber and adapted to be distended to bring into electrical connection said contacts and energize said device upon the expansion of air in said chamber against the diaphragm responsive to the action of heat, said chamber having a restricted orifice through which the air in said chamber may slowly equalize with the atmosphere, means securing the periphery of the diaphragm upon said support, said diaphragm being of smaller diameter than said shell and located in spaced relation with the latter, said support having a testing aperture formed therein and communicating with said chamber between the periphery of the diaphragm and the shell and adapted for injecting air under pressure into said chamber for testing the response of said diaphragm to air under pressure, and means for sealing said testing aperture.

21. In a device of the character described, an insulating support, a pair of electrical contacts mounted upon said support and adapted for connection with a source of current supply and an energizable device, an annular flange upon said support, a thin metal hemispherical shell secured upon said flange and forming an air chamber, said chamber having a restricted orifice through which air in said chamber may slowly equalize with the atmosphere, a flexible diaphragm electrically connected with one of said contacts and forming one wall of said chamber and adapted to be distended to bring said contacts into electrical connection by pressure of the expanded air in the chamber against the diaphragm responsive to the action of heat, means securing the periphery of the diaphragm upon said support, said diaphragm being of smaller diameter than said shell and located in spaced relation with the latter, said support having a conical aperture formed therein and communicating with said chamber between the periphery of the diaphragm and the shell and located separately from said restricted orifice, said conical aperture tapering inwardly toward said chamber, and adapted for injecting air under pressure into said chamber for testing purposes, and means for sealing said aperture.

WILLIAM B. GRIFFITH.